United States Patent
Yao et al.

(10) Patent No.: US 10,098,462 B2
(45) Date of Patent: Oct. 16, 2018

(54) KD CHAIR AND STOOL CONSTRUCTION

(71) Applicants:Zheng Yao, Hudson (CA); Douglas Tripp, Mattawan, MI (US)

(72) Inventors: Zheng Yao, Hudson (CA); Douglas Tripp, Mattawan, MI (US)

( * ) Notice: Subject to any disclaimer, the term of this patent is extended or adjusted under 35 U.S.C. 154(b) by 0 days.

(21) Appl. No.: 15/043,101

(22) Filed: Feb. 12, 2016

(65) Prior Publication Data

US 2017/0231392 A1     Aug. 17, 2017

(51) Int. Cl.
| | | |
|---|---|---|
| *A47C 4/02* | (2006.01) | |
| *A47C 4/03* | (2006.01) | |
| *F16B 12/14* | (2006.01) | |

(52) U.S. Cl.
CPC .............. *A47C 4/028* (2013.01); *A47C 4/024* (2013.01); *A47C 4/03* (2013.01); *F16B 12/14* (2013.01)

(58) Field of Classification Search
CPC ........... A47C 4/02; A47C 4/021; A47C 4/024; A47C 4/028; A47C 4/03; A47C 7/021; A47C 7/42; A47C 7/16; A47C 31/11
(Continued)

(56) References Cited

U.S. PATENT DOCUMENTS

| | | | |
|---|---|---|---|
| 233,478 | A | 10/1880 | Creager |
| 693,197 | A | 11/1901 | White |

(Continued)

FOREIGN PATENT DOCUMENTS

| | | | | |
|---|---|---|---|---|
| EP | 1616505 A1 | * | 1/2006 | ............. A47C 4/024 |
| EP | 1616505 A1 | * | 1/2006 | ............. A47C 4/024 |

(Continued)

*Primary Examiner* — Ryan D Kwiecinski
(74) *Attorney, Agent, or Firm* — Legal Office of David J Johnson, PLLC

(57) ABSTRACT

A ready-to-assemble upholstered and non-upholstered chair consisting of factory assembled sub-assemblies reducing the number of overall parts and assembly hardware which decreases the packaged cubic measure allowing more units to be loaded into shipping containers and trailers, inventoried in warehouses and distribution centers and displayed in retail outlets thereby reducing transportation and handling costs, while simplifying and expediting the assembly process. The invention includes a seat box sub-assembly so constructed to allow a portion of the chair back leg sub-assembly to nest therein reducing the package profile and cubic measure, as well as a front leg sub-assembly. The front leg and back leg sub-assemblies are assembled utilizing a left and right tenoned side rail which inserts into mortises on the front and back leg assemblies. The leg sub-assemblies are secured with a metal bolt, threaded on each end, housed longitudinally within a routed channel running on the exterior face of each side rail. The bolt is secured by threading one end into the pre-installed knurled nut in the back leg sub-assembly and a hex socket T-nut and washer on the face of the front leg sub-assembly. The seat box sub-assembly is fitted over the front leg sub-assembly and the left and right side rails and secured on the underside with metal bolts. With the factory manufactured pre-assemblies resulting in fewer joints, the assembled chair is stronger eliminating potential racking. On upholstered chairs, the removable outer decorative back and seat cover are positioned over the chair back and chair seat and quickly Velcro's into place. Chair covers can be removed for cleaning or retailers can sell additional covers in a variety of materials and designs without needing to stock additional chairs. Once assembled, the invention offers the distinction that no assembly hardware is visible, giving the chair a "factory made" look.

14 Claims, 6 Drawing Sheets

(58) Field of Classification Search
USPC .......................... 297/440.1, 440.14, 440.18
See application file for complete search history.

(56) References Cited

U.S. PATENT DOCUMENTS

| | | | |
|---|---|---|---|
| 719,837 A | 12/1901 | Morton | |
| 1,432,349 A | 7/1921 | McFarland | |
| 1,813,072 A | 6/1929 | Murdock | |
| 1,734,144 A * | 11/1929 | Morin | A47C 4/02 248/188 |
| 3,374,353 A | 3/1968 | Lupinski | |
| 3,556,594 A * | 1/1971 | Anderson | A47C 4/02 297/440.22 |
| 4,008,971 A | 2/1977 | Wah et al. | |
| 4,030,846 A | 6/1977 | Flototto | |
| 4,261,665 A | 4/1981 | Hsuing | |
| 4,261,667 A | 4/1981 | Ervin et al. | |
| 4,280,269 A | 7/1981 | Marini | |
| 4,563,040 A | 1/1986 | Alster | |
| 4,577,906 A * | 3/1986 | Hsiung | A47C 4/028 297/440.18 |
| 4,691,965 A | 9/1987 | Hsiung | |
| 4,958,425 A | 9/1990 | Gomes | |
| 5,088,180 A * | 2/1992 | Nottingham | A47C 3/00 29/469 |
| 5,277,476 A | 1/1994 | Caldwell | |
| 5,332,289 A * | 7/1994 | Nottingham | A47C 3/00 248/165 |
| 5,407,250 A | 4/1995 | Prince et al. | |
| 5,601,340 A | 2/1997 | Stout | |
| 5,720,457 A | 2/1998 | Miller et al. | |
| 5,810,505 A | 9/1998 | Henriott et al. | |
| 6,267,446 B1 * | 7/2001 | Wieland | A47C 4/021 297/188.08 |
| 6,409,267 B1 * | 6/2002 | Pietrzak | A47C 7/02 297/440.22 |
| 7,296,859 B1 * | 11/2007 | Branch, III | A47C 3/029 297/440.14 |
| 7,404,607 B2 | 7/2008 | Crue | |
| 2001/0052723 A1 * | 12/2001 | Wu | A47C 4/022 297/440.1 |
| 2002/0043865 A1 * | 4/2002 | Bruschi | A47C 3/04 297/440.1 |
| 2009/0072599 A1 * | 3/2009 | Xu | A47C 3/04 297/239 |
| 2009/0179464 A1 * | 7/2009 | Wright | A47B 3/083 297/59 |
| 2010/0187891 A1 * | 7/2010 | O'Connor | A47C 4/024 297/451.13 |
| 2014/0015298 A1 * | 1/2014 | Xu | A47C 4/02 297/440.1 |
| 2017/0119158 A1 * | 5/2017 | Pectol | A47C 4/024 |

FOREIGN PATENT DOCUMENTS

| | | | | |
|---|---|---|---|---|
| EP | 2842459 A1 * | 3/2015 | ............ | A47C 4/02 |
| FR | 2895889 A1 * | 7/2007 | ............ | A47C 3/00 |

* cited by examiner

KD CHAIR AND STOOL CONSTRUCTION

CROSS REFERENCE TO RELATED APPLICATION

This application claims priority to U.S. Provisional Patent Application No. 62/116,097, filed Feb. 13, 2015, the entire content of which is incorporated herein by reference.

STATEMENT REGARDING FEDERALLY SPONSORED RESEARCH OR DEVELOPMENT

Not applicable

FIELD OF THE INVENTION

The present invention relates to the field of furniture, particularly ready-to-assemble chairs with sub-assemblies which reduces the total number of components and a single linear threaded attaching rod which results in a stronger, more stable, quicker and simpler assembly and disassembly and configured in such a way that in their dissembled state can be packaged in a carton so as to reduce cubic measure thereby reducing transportation, handling and storage costs.

BACKGROUND OF THE INVENTION

Ready-to-assemble furniture continues to grow in popularity. The number of retail outlets selling ready-to-assemble furniture continues to grow both domestically and internationally with a number of retailers having an international presence. The manufacturing and production of ready-to-assemble furniture is also global. Retailers, both domestic and international, may purchase ready-to-assemble furniture from factories in a number of countries throughout the world, shipping into central distribution centers to be redistributed out to their retail outlets. Many of these distribution centers are highly automated with sophisticated conveyor systems to sort and move products extremely efficiently and economically. Because these companies exist in a highly competitive environment, reducing costs and increasing efficiency are paramount to being and remaining competitive and profitable. Therefore, improving logistics is a continuous process. Reducing the cubic measure of cartoning and packaging by using construction methods which utilize factory manufactured sub-assemblies which nest allows more items to be loaded within semi-trailers and shipping containers reducing the freight cost per item for both brick-and-mortar and ecommerce retailers; saves on warehouse space, conveyorizes more efficiently and requires less shelf space in a retail outlet.

Freight costs, which are independent of manufacturing costs, offer their own potential area of cost reduction. The more units which can be loaded into trailers, containers and other shipping vessels, the more the per unit cost can be reduced. Therefore, the actual landed cost—unit cost plus freight cost plus duties, insurance and other related costs—is reduced. The positive affect of this is that the savings can be passed along to customers or used to improve gross margins and profits. When parts can be designed and manufactured to be nested within one another, the cubic volume of the packaged unit can be reduced leading to tangible and beneficial savings for organizations.

With consumers having more demanding schedules, saving time becomes important. A key resistance to ready-to assemble furniture is the time spent assembling and the difficulty in assembling units as well as the confusion often caused by poorly written instructions. Reducing and simplifying the assembly experience is critical to the success of each item as well as the growth of the ready-to-assemble industry. As an example, a growing category within the ready-to-assemble industry is "no tools required" product. As the name implies, consumers can take product out of its packaging and assemble without the need of tools. Although this puts sever limits on how sophisticated products can be designed, in the consumers' eyes it is time saving and simple to assemble. For many items such as basic bookcases, tables, plant stands and the like function and low cost is more important than design. For more fashionably designed product it is, therefore, desirable to be able to manufacture ready-to-assemble furniture which incorporates current trends and styles but is also cost efficient in both manufacturing and logistics and quick and simple to assemble. Minimizing the number of parts needing to be assembled and the number of tools needed to do the assembly contribute to making ready-to-assembly products consumer friendly. Fewer parts also means fewer joints (which can loosen over time) leading to sturdier, more stable units once assembled.

In reviewing the prior art, U.S. Pat. No. 4,563,040 to Alster, the assembly of shown table or chair is accomplished with individual parts assembled into the desired configuration. Because of the large number of parts individually connected to one another, a large number of joints are created, generating more points of weakness within the structure. The stress generated at each joint results in a loosening effect, transferred from joint to joint as the unit racks from use. In using wood dowels and wood nuts referred to as "rod caps," only a limited amount of torque is able to be applied to secure each connection. With such a large number of individual parts, units constructed using the Alster system also take a significant amount of time to assemble which consumers see as a negative feature. It also is a time consuming chore to retighten all of these joints. Additionally, U.S. Pat. No. 719,837 to Morton; U.S. Pat. No. 1,813,072 to Murdock; U.S. Pat. No. 4,261,667 to Ervin et al., the use of individual and separate parts and not sub-assemblies and the inability to apply sufficient torque, and in some cases, no torque at all, will, over time, generate weaker joints. A common weakness in all of these systems, therefore, is the number of joints created using such a large number of individual parts. Without being able to generate enough torque during assembly the joints cannot be made sufficiently rigid to withstand normal wear and tear without racking. Nor is there a way to quickly retighten each individual part at each joint when joints do loosen—a natural occurrence when the units are used as envisaged. The "MODULAR KNOCKDOWN CHAIR", U.S. Pat. No. 5,407,250 to Prince et al. also has the same weaknesses as found in the prior art surveyed above, but does suggest a pre-assembled back and seat, but not incorporating the back legs or front legs into a sub-assembly. It also discloses the limited use of mortise and tenon joints in FIG. 4 using a wood screw to secure the joint. The joint based on a wood screw made of metal into a wood part, particularly in a rocking chair as shown in FIG. 3 of Prince et al., will quickly lose much of its holding power and, in all likelihood, strip out if tightened too aggressively. In U.S. Pat. No. 233,478 to Creager, a back leg and front leg assembly is envisioned, but weaknesses are again created with the number of joints and lack, in this case, of any torque being applied to create a strong rigid connection resistant to racking. The joint envisaged in Creager appears to be a glued joint with no mechanical fastening devises.

All of these noted systems have inherent weaknesses which the embodiment of this invention overcomes. Listed below are additional relevant patents:
U.S. Pat. No. 693,197 February 1902 White
U.S. Pat. No. 1,432,349 October 1922 McFarland
U.S. Pat. No. 3,374,353 July 1973 Lupinsky
U.S. Pat. No. 4,008,971 February 1977 Wah et al.
U.S. Pat. No. 4,030,846 June 1977 Flototto
U.S. Pat. No. 4,261,665 April 1981 Hsiung
U.S. Pat. No. 4,280,269 July 1981 Marini
U.S. Pat. No. 4,691,965 September 1987 Hsiung
U.S. Pat. No. 4,958,425 September 1990 Gomes
U.S. Pat. No. 5,088,180 February 1992 Nottingham et al.
U.S. Pat. No. 5,277,476 January 1994 Caldwell
U.S. Pat. No. 5,720,457 February 1998 Miller et al.
U.S. Pat. No. 5,601,340 February 1997 Stout
U.S. Pat. No. 5,810,505 September 1998 Henriott et al.
U.S. Pat. No. 7,404,607 B2 July 2008 Crue

SUMMARY OF THE INVENTION

This invention provides for a unique construction for chairs both upholstered and non-upholstered utilizing factory manufactured sub-assemblies, the ability to nest one sub-assembly within another, metal rods, bolts, and removable chair back and seat covers which in combination reduce the cubic measure of the chair once packaged for reduced transportation, warehouse storage, handling and inventory costs; simplified and reduced assembly times while yielding a stronger and sturdier unit. The construction is ideal for, but not limited to, dining, accent and slipper chairs; bar and counter stools or any chair which is constructed with a 4 sided seat box construction. Removable covers can be made of woven and non-woven fabric, leather, PVC or any pliable material which can be sewn into the corresponding back and seat covers. In the preferred embodiment each chair consists of a factory assembled arched-legged or straight-legged chair back sub-assembly consisting of two (2) full length arched or straight legs permanently connected together with a determined number of cross rails based on each chairs height with the upper back support section of solid material such as wood or metal for non-upholstered chairs or wrapped with upholstery foam and upholstered in a protective permanently attached fabric ready to accept the back cover for upholstered chairs; a front factory assembled front leg sub-assembly consisting of the 2 chair front legs with a permanently attached cross rail connected to the top portion of each leg; a factory assembled 3 sided seat box sub-assembly with upholstery foam covered with a protective permanently attached fabric prepared to accept the seat cover; a left and right horizontal side rail machined to the correct length as determined by each chair's specifications and machined to accept the front and arched or straight back leg sub-assemblies; two (2) metal attaching bolts, nested within a rabbet machined longitudinally within the side rail and a metal hex socket T-nut and knurled nut securing the front leg assembly to the back leg assembly; and a fitted chair back and chair seat cover to complete the assembly of the embodied invention. Because of the superior tensile strength of the metal bolts over common wood used in chair constructions, this invention is significantly stronger.

The chair construction is manufactured so that the upholstered top portion of said arched back leg assembly nests within said 3 sided seat assembly significantly reducing the height of the packing carton which reduces the cubic size of packaging increasing the unit load factor in any shipping container and reducing freight costs.

The said fitted covers described above are quickly and easily slid over the factory installed protective material and Velcro's easily in place. Because the covers are easily attached and removed, said covers can be conveniently cleaned. Covers can be sold separately so that retailers can stock one chair and sell an infinite number of covers saving warehouse space, reducing inventory costs and reduced shelf space maximizing store sales per square foot. Covers can be mixed and matched. For example, two (2) cover sets (each set contains a back cover and seat cover) can give consumers 4 cover options.

The embodiment of this invention because of said factory pre-assemblies reduces the number of individual parts. The resulting embodiment is a stronger, more rigid construction eliminating racking and loosens joints. In the event said embodiment ever loosens, removing the 2 bolts securing the seat box and removing said seat box exposes the 2 securing hex socket T-nuts. Because of the pre-assemblies, tightening the 2 securing nuts returns said embodiment to its original strength and solidity.

DETAILED DESCRIPTION OF THE INVENTION

Figure 1:
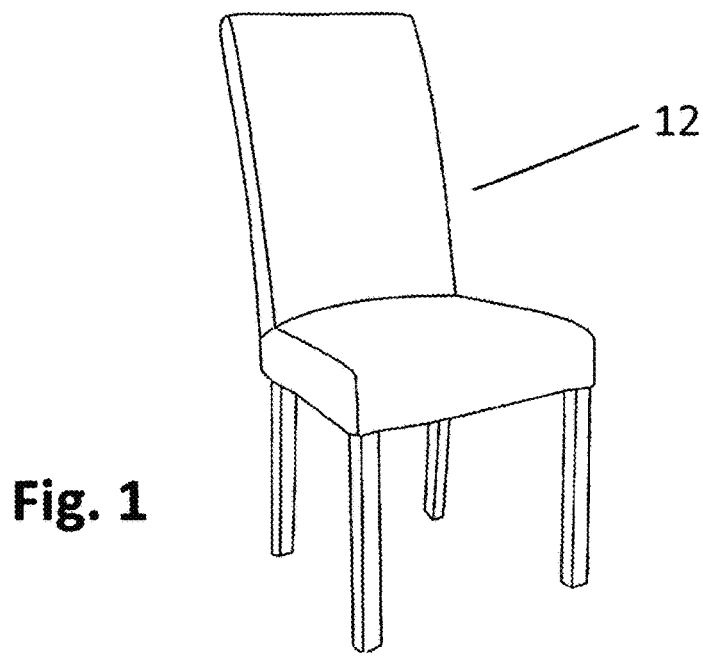
FIG. 1 is perspective view of assembled chair.
Figure 2:
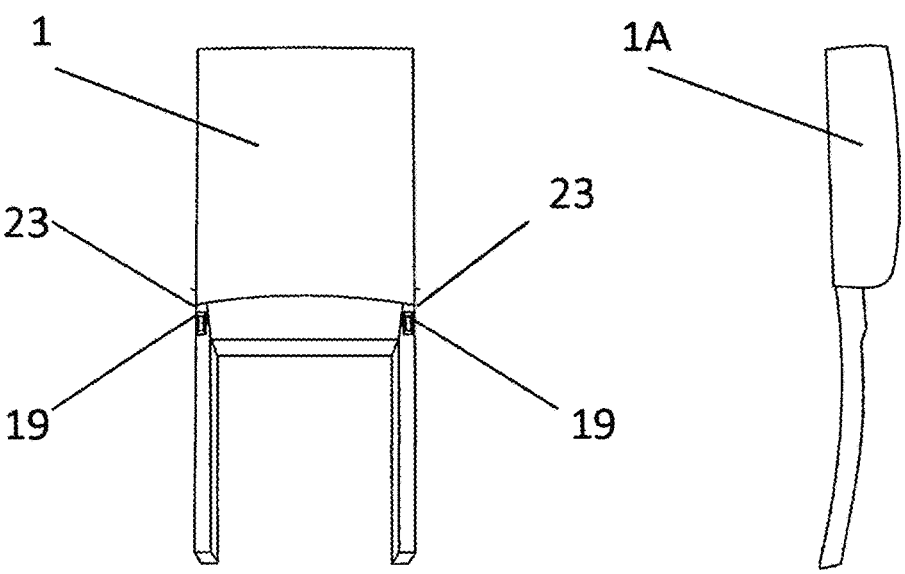
FIG. 2 shows view of factory chair back pre-assembly.
Figure 3:
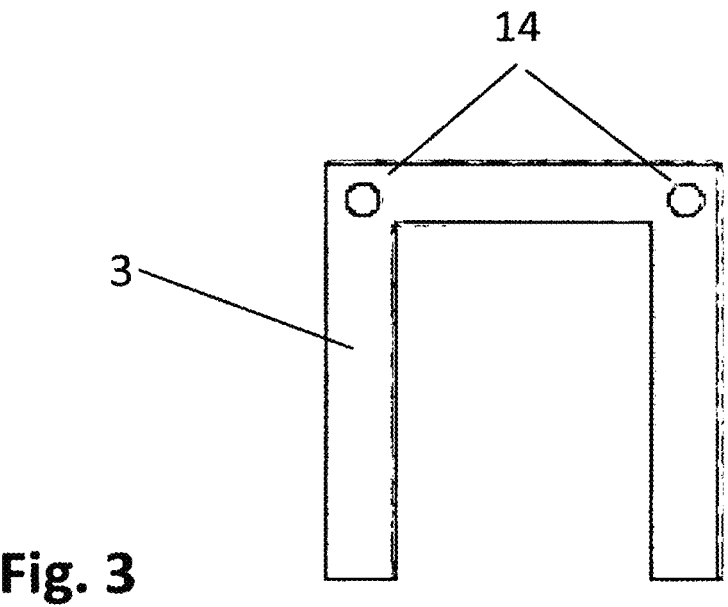
FIG. 3 shows view of factory front leg pre-assembly.
Figure 4:
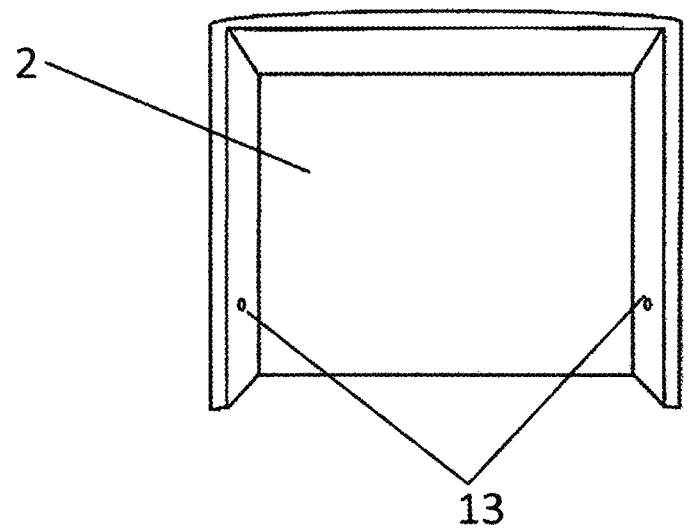
FIG. 4 shows view of underside of seat box factory pre-assembly.
Figure 5:
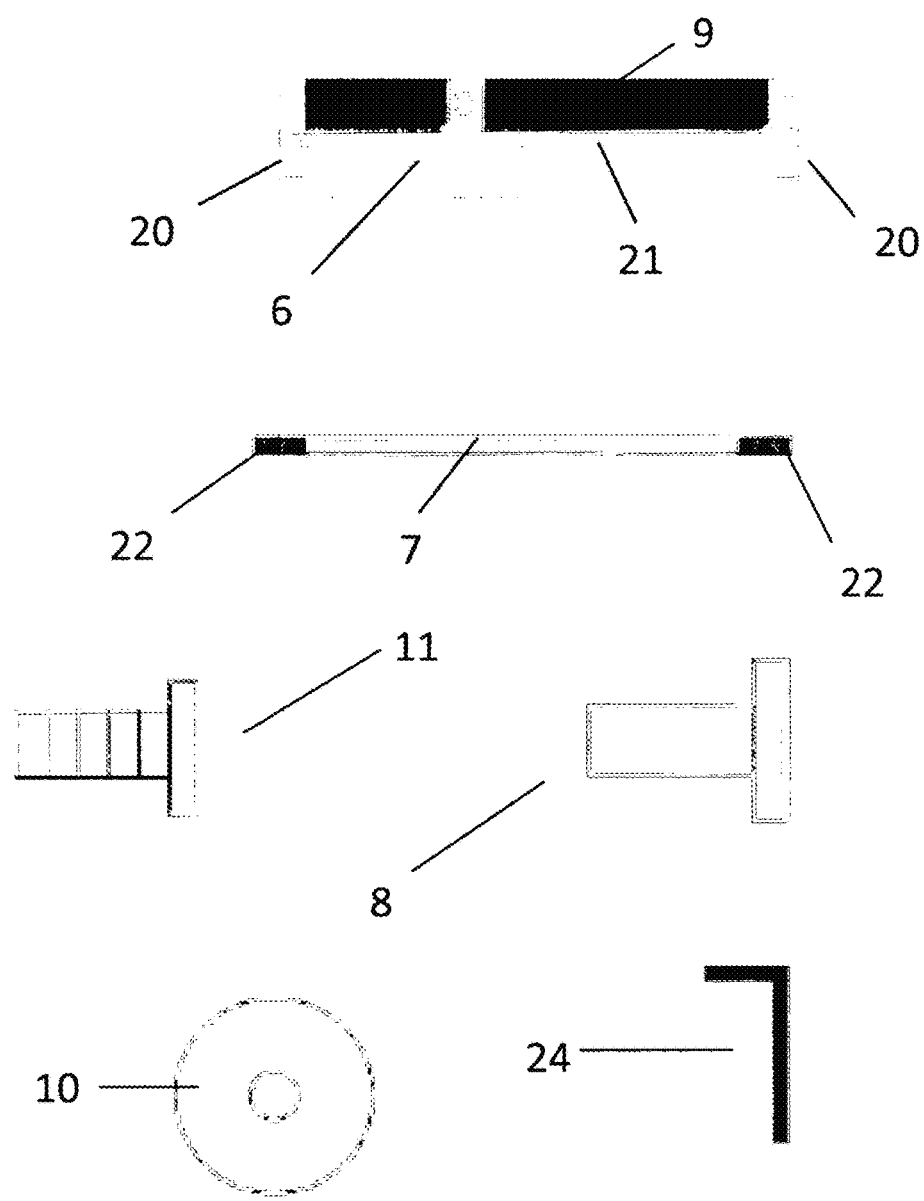
FIG. 5 is detail drawing of connecting rails, connecting rods, washer and securing nuts.
Figure 9:
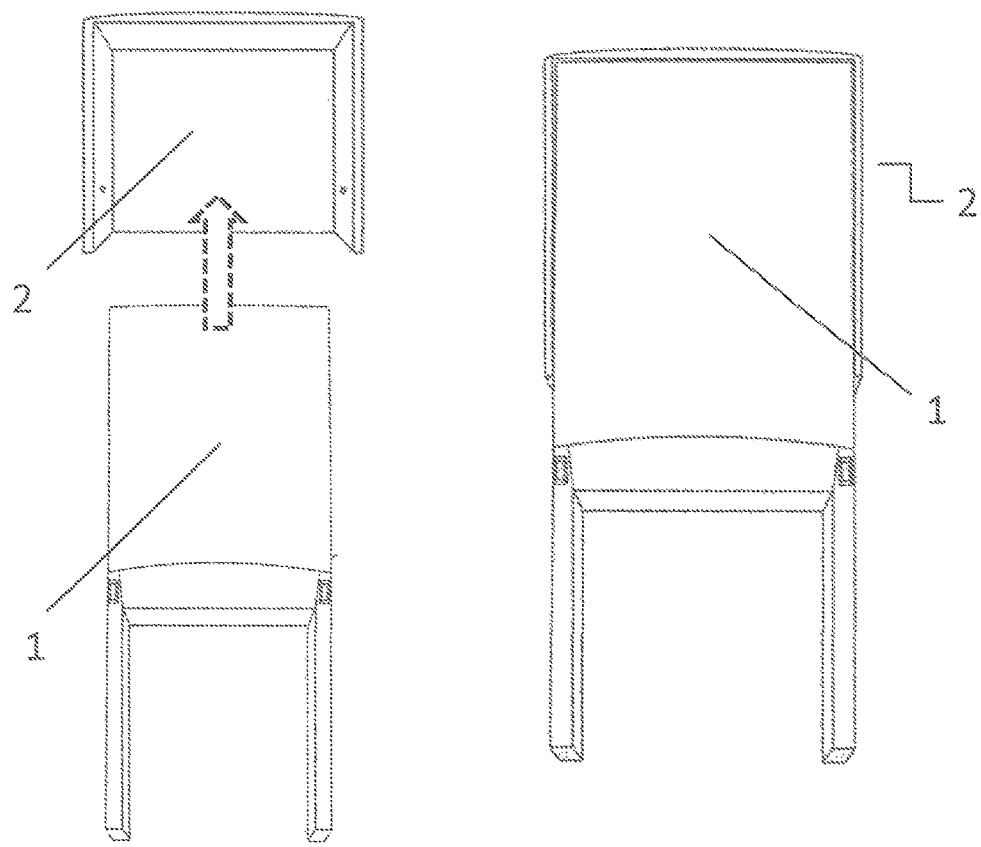
FIG. 9 shows chair back leg-assembly nested in seat box assembly to reduce package size.
Figure 10:
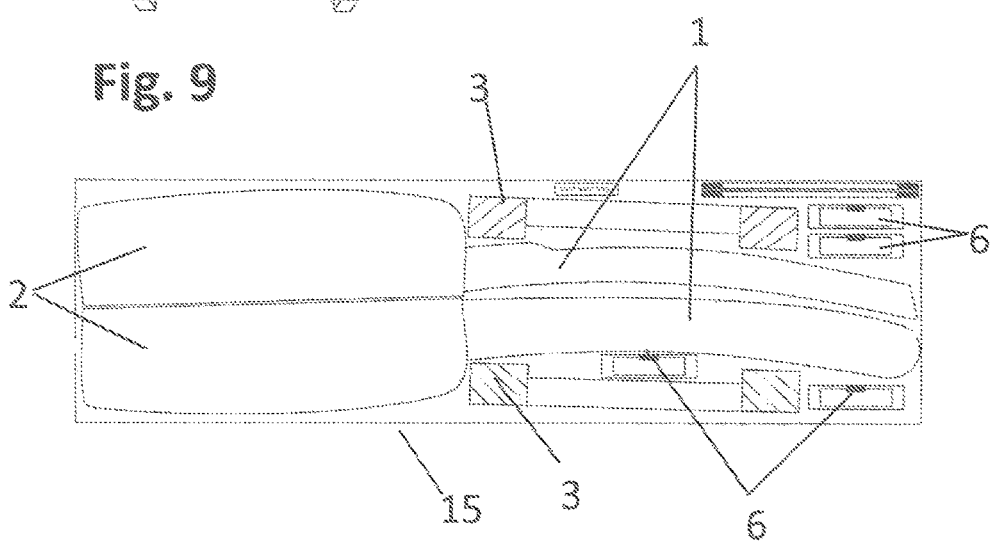
FIG. 10 illustrates typical ready-to-assemble cartoning of invention.

FIG. 1 shows the final assembled preferred embodiment of a ready-to-assemble chair 12 of the present invention. The chair is composed of three (3) sub-assemblies: the factory assembled back sub-assembly, FIG. 2, (1, 1A); the factory assembled front leg sub-assembly, FIG. 3, (3); and the factory assembled seat box sub-assembly, FIG. 4, (2). The preassembled back assembly 1 consists of a determined number of structural and/or ornamental cross rails (e.g., 18), a mortise 19 on the interior of each leg of the assembly with a knurled nut 23 inserted within the mortise 19 to receive the threaded end 22 of the metal attaching rod 7. The front leg sub-assembly consists of the two front legs and a top cross rail existing on the same plane and assembled in a horseshoe shape. The left and right top corners have a hole 14 bored through, through which the attaching rod 7 is to be fed to attach the back leg sub-assembly to the front leg sub-assembly. Washer 10 and hex socket T-nut 8 will be placed over the hole onto the attaching rod threaded end 7 as part of the assembly process. The preassembled seat box 2 is a three-sided box, wherein the top face of the box attached to the edges of the adjacent sides becomes the sitting surface. The sitting surface can be manufactured from a number of materials such as, but not limited to, the following: a solid surface, an upholstery web surface or an upholstery spring surface. The open bottom of the seat box sub-assembly FIG. 4 has one open side. The open side allows either the top or bottom of the chair back leg sub-assembly 1 to be nested inside the seat box sub-assembly as shown in FIG. 9 to reduce the height dimension of the shipping carton and, therefore, the overall cubic measure of the invention.

Figure 6:
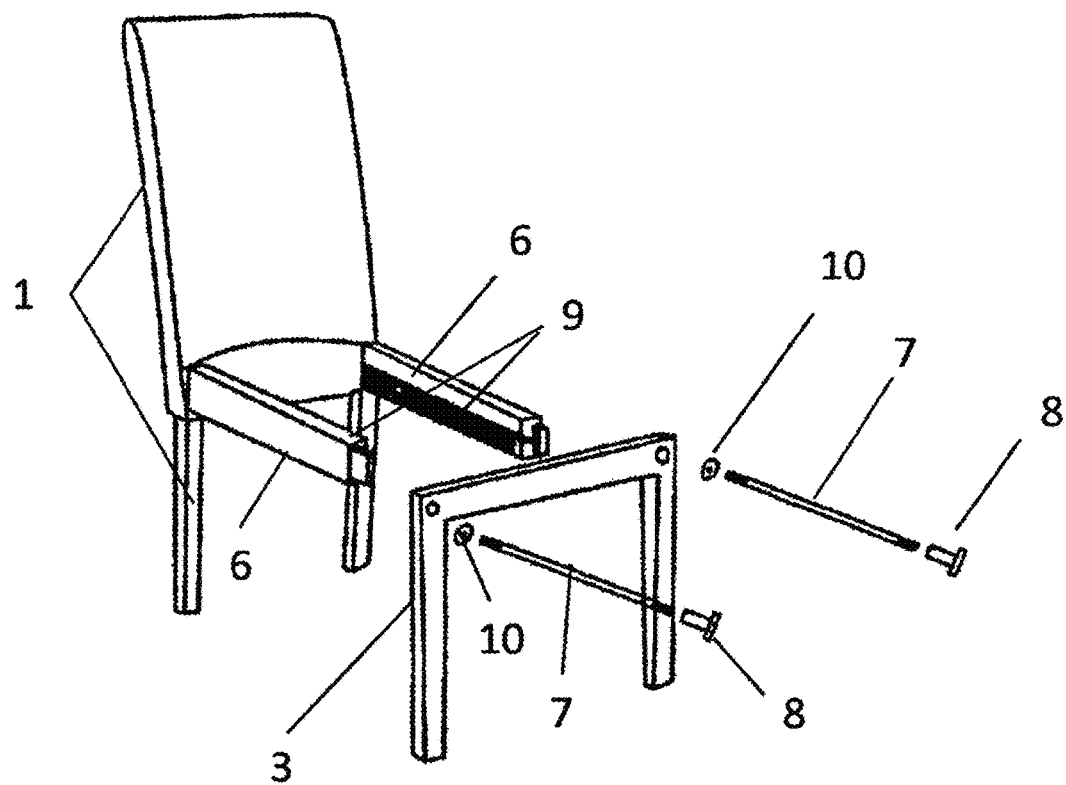
FIG. 6 is exploded view of chair structural assembly.
Figure 7:
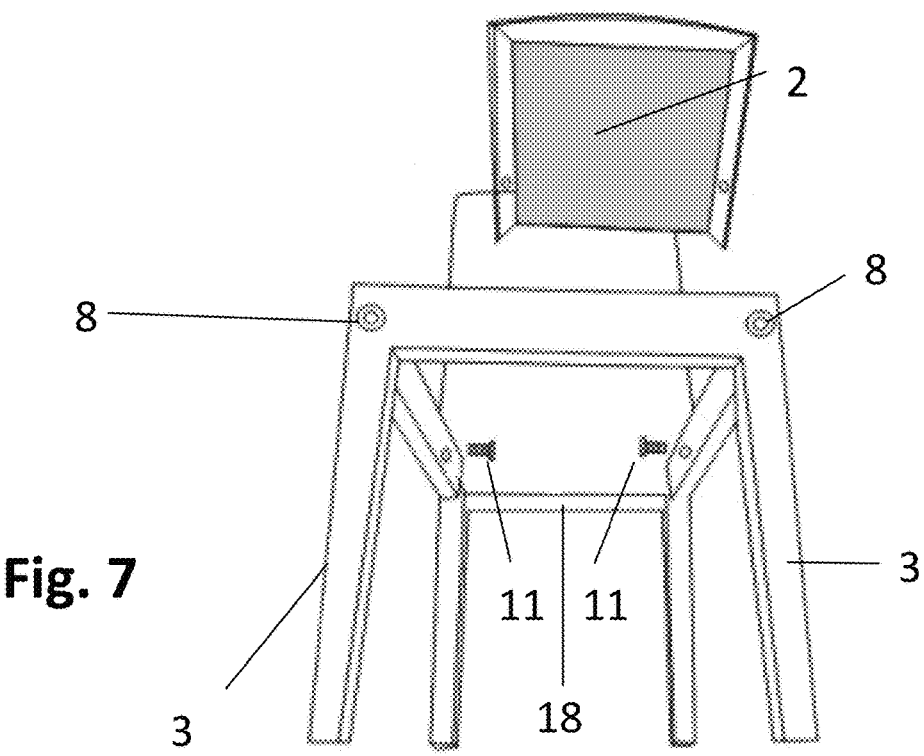
FIG. 7 shows view of seat box installation to chair frame.
Figure 8:
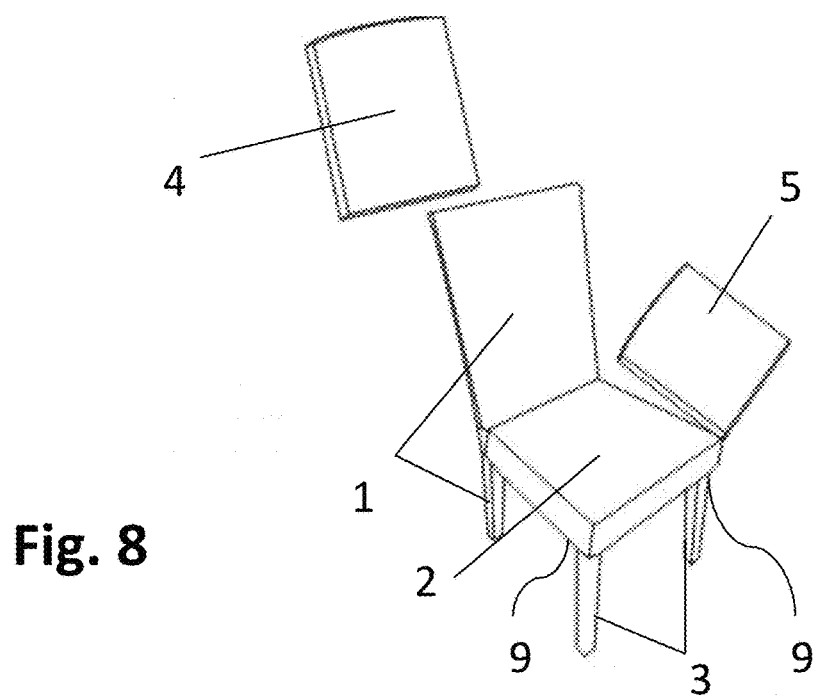
FIG. 8 shows back and seat cover attachment.

In FIG. 6, the structural assembly of the embodiment is shown, whereby a tenoned end (20) of the side rail (6) is inserted into the mortise (19) of the back leg sub-assembly (1). The side rails (6) are positioned in the mortises 19 so that the Velcro strips 9 are facing inward. The threaded attaching rod 7 is next positioned in the rabbeted groove 21 running longitudinally the length of the side rail 6 and screwed into the factory installed knurled nut 23 within the mortise 19. The side rail and attaching rod are inserted into a mortise on the interior side of the front leg sub-assembly 3 with the threaded end of the attaching rod 7 protruding through the bored hole 14 on the front leg assembly 3. Washers 10 are slid over the end of both attaching rods now protruding through the hole on the front surface of the leg sub-assembly 3. See also FIG. 7 (8). The hex socket T-nut 8 is attached to the protruding ends of each attaching rod 7 and tightened with maximum manual torque using wrench 24 insuring a rigid and static structure. The seat box sub-assembly 2 is placed over the structural frame made by the assembly of the front and back leg sub-assemblies and the side rails as shown in FIG. 7 and secured in place with bolts 11 in prebored holes 13. Because the assembly has been reduced to four joints (two in the back where the back leg sub-assembly is joined to the two rear facing side rail tenons 20 and the front leg sub-assembly is joined to the forward facing side rail tenons 20) the chance the chair can rack and become racked is significantly reduced over constructions with a high number of individual parts, each connected singly making an inordinately high number of joints susceptible to loosening and racking. The attaching rods 7, having significantly more tensile strength than wood dowels secured with glue and/or wood screws or cams and cam bolts, and, in conjunction with the hex socket T-nut 8, washer 10, and knurled nut 23, can be tightened with sufficient torque to assure a rigid and stable assembly. The final step in the assembly of this embodiment of the invention is the installation of the decorative covers. As shown in FIG. 8, the back decorative cover 4 is slid over chair back sub-assembly 1 and the seat decorative cover 5 is wrapped around seat box sub-assembly 2 and Velcros to the pre-attached Velcro strips 9.

It should be noted that the embodiments discussed above, the upholstered version of the embodiment in particular, are used to illustrate the invention and do not represent the complete range of the embodiments of the invention. The invention and its features may be used and adapted without departing from the scope of the invention by those knowledgeable and experienced in the field. Therefore, the invention is not limited in its application to the descriptions and details described herein, the scope of which is defined by the following claims.

What is claimed:

1. A ready-to-assemble chair that reduces the size of packaging needed to store said chair prior to assembly, comprising: a seat box sub-assembly, wherein said seat box sub-assembly is preassembled and comprises a top seat surface, three closed sides, and one open side; a chair back leg sub-assembly, wherein said chair back leg subassembly is preassembled and comprises at least two back legs, and at least one structural cross rail connecting the at least two back legs, wherein at least a portion of said chair back leg sub-assembly is defined by having three sides; said portion of said chair back leg sub-assembly configured to nest within the three closed sides of the seat box sub-assembly such that each one of the three sides of the chair back leg sub-assembly aligns with a corresponding one of the three closed sides of the seat box sub-assembly, and a front leg subassembly comprising at least one front leg.

2. The ready-to-assemble chair according to claim 1, wherein the front leg sub-assembly is pre-assembled.

3. The ready-to-assemble chair according to claim 1, wherein said chair back leg sub-assembly having a width, the width of the chair back sub-assembly being constant throughout the length of the chair back leg sub-assembly.

4. The ready-to-assemble chair according to claim 1, further comprising
   two rods each with at least one threaded end; and
   left and right side-rails, wherein each of said left and right side rails have a longitudinal channel capable of accepting one of the rods;
   wherein the chair back leg sub-assembly further comprises two knurled nuts, with one of said knurled nuts per each of the two back legs, wherein each of the knurled nuts is capable of accepting one of the rods, and
   the front leg sub-assembly further comprises two holes, each of the holes capable of accepting one of the rods, and
   the said holes, channels, and knurled nuts are configured to be aligned such that each of the rods can extend simultaneously into one hole, channel and knurled nut to facilitate securing said chair back leg sub-assembly, side rails and front leg sub-assembly to each other.

5. The ready-to-assemble chair according to claim 4, wherein the longitudinal channel of the side rails is on an exterior surface.

6. The ready-to-assemble chair according to claim 4, wherein the rods have a bolt head on one end.

7. The ready-to-assemble chair according to claim 4, wherein said holes, channels and nuts are configured to be positioned such that when the rods are tightened securing said chair back leg sub-assembly, side rails and front leg sub-assembly to each other and the seat box sub-assembly placed atop the side rails and front leg sub-assembly, said seat box sub-assembly covers said holes.

8. The ready-to-assemble chair according to claim 1 wherein the back leg sub-assembly further comprises an upper back support section, further comprising a removable seat cover and seat back cover.

9. A ready-to-assemble chair, comprising
   a seat box sub-assembly, wherein said seat box sub-assembly is preassembled and comprises a top seat surface, with at least one closed side and;
   a chair back leg sub-assembly comprising at least two back legs, and at least one structural cross rail connecting the two legs;
   a front leg sub-assembly, comprising at least one front leg;
   two rods, wherein said rods have at least one threaded end; and
   left and right side-rails, wherein the side rails each have a longitudinal channel capable of accepting one of the rods;
   wherein the chair back leg sub-assembly further comprises two knurled nuts with one of said knurled nuts per each of the two back legs, wherein each of the knurled nuts is capable of accepting one of the rods, and
   the front leg sub-assembly further comprises two holes, each of the holes capable of accepting one of the rods, and said holes, channels, and knurled nuts are configured to be aligned such that each of the rods can extend simultaneously into one hole, channel and knurled nut to facilitate securing said chair back leg sub-assembly, side rails and front leg sub-assembly to each other wherein said holes, channels and nuts are configured to be positioned such that when the rods are tightened securing said chair back leg sub-assembly, side rails and front leg sub-assembly to each other and the seat box sub-assembly placed atop the side rails and front leg sub-assembly, said at least one closed side of said seat box assembly covers said holes.

10. The ready-to-assemble chair according to claim 9, wherein said seat box subassembly has one open side and three closed sides, and wherein at least a portion of said chair back leg sub-assembly is defined by having three sides; said portion of said chair back leg sub-assembly configured to nest within the three closed sides of the seat box sub-assembly such that each one of the three sides of the chair back leg sub-assembly aligns with a corresponding one of the three closed sides of the seat box sub-assembly.

11. The ready-to-assemble chair according to claim 9, wherein each of the chair back leg sub-assembly, and front leg sub-assembly are pre-assembled.

12. The ready-to-assemble chair according to claim 9, wherein the seat box sub-assembly has one open side.

13. The ready-to-assemble chair according to claim 9, wherein said chair back leg sub-assembly having a width, the width of the chair back leg sub-assembly being constant throughout the length of the chair back leg sub-assembly.

14. The ready-to-assemble chair of claim 9, wherein the longitudinal channel of the side rails is on an exterior surface.

* * * * *